United States Patent [19]

Seitz

[11] Patent Number: 4,729,792
[45] Date of Patent: Mar. 8, 1988

[54] MICROCAPSULES, PRINTING INKS AND THEIR PRODUCTION

[75] Inventor: Michael E. A. Seitz, Dayton, Ohio

[73] Assignee: The Standard Register Company, Dayton, Ohio

[21] Appl. No.: 866,224

[22] Filed: May 22, 1986

Related U.S. Application Data

[63] Continuation-in-part of Ser. No. 796,196, Nov. 8, 1985, abandoned.

[51] Int. Cl.$^4$ .................. B01J 13/02; C09D 11/00
[52] U.S. Cl. ........................... 106/21; 264/4.3; 427/150; 428/402.2; 503/215
[58] Field of Search ............ 264/4.3; 428/402.2; 106/21

[56] References Cited

U.S. PATENT DOCUMENTS

| | | | |
|---|---|---|---|
| 2,800,457 | 7/1957 | Green et al. | 428/402.2 |
| 3,016,308 | 1/1962 | Macaulay | 346/200 |
| 3,079,351 | 2/1963 | Staneslow et al. | 346/208 |
| 3,137,631 | 6/1964 | Soloway | 428/402.2 X |
| 3,578,605 | 5/1971 | Baxter | 264/4.3 |
| 3,684,549 | 8/1972 | Shank | 346/208 |
| 3,897,361 | 7/1975 | Saeki et al. | 264/4.3 |
| 3,914,511 | 10/1975 | Vassiliades | 346/206 |
| 3,954,678 | 5/1976 | Marquisee | 252/62.53 X |
| 3,979,550 | 9/1976 | Panken | 106/21 X |
| 3,994,827 | 11/1976 | Sakai et al. | 264/4.3 X |
| 4,051,165 | 9/1977 | Wagner et al. | 560/335 |
| 4,091,122 | 5/1978 | Davis et al. | 427/44 |
| 4,097,619 | 6/1978 | Davis et al. | 427/44 |
| 4,112,138 | 9/1978 | Davis et al. | 427/54 |
| 4,137,084 | 1/1979 | Davis et al. | 106/21 |
| 4,138,362 | 2/1979 | Vassiliades et al. | 428/402.21 |
| 4,138,508 | 2/1979 | Spatz et al. | 427/54 |
| 4,161,570 | 7/1979 | Lee et al. | 521/53 |
| 4,176,361 | 11/1979 | Kawada et al. | 346/1.1 |
| 4,193,889 | 3/1980 | Baatz et al. | 428/402.21 |
| 4,356,108 | 10/1982 | Schwab et al. | 346/215 X |
| 4,404,251 | 9/1983 | Jabs et al. | 106/21 X |
| 4,435,340 | 3/1984 | Horrike et al. | 264/4.7 |
| 4,441,928 | 4/1984 | Iyima | 106/21 |

FOREIGN PATENT DOCUMENTS

| | | | |
|---|---|---|---|
| 0037477 | 10/1981 | European Pat. Off. | |
| 0088566 | 9/1983 | European Pat. Off. | |
| 2244484 | 3/1973 | Fed. Rep. of Germany | |
| 1091076 | 11/1967 | United Kingdom | 264/4.7 |
| 1393753 | 5/1975 | United Kingdom | |

*Primary Examiner*—Richard D. Lovering
*Attorney, Agent, or Firm*—Killworth, Gottman, Hagan & Schaeff

[57] ABSTRACT

Microcapsules having hard, thick walls are formed by dispersing an oily solution containing a crosslinking agent in an aqueous solution, and forming a polysalt in the aqueous solution, the polysalt including a high molecular weight polyanion and a polycationic polyamine having a functionality of at least three. The polyanion is preferably casein. If the surface of the microcapsules formed in the aqueous solution is lipophilized, the microcapsules easily separate from the solution by filtration. By use of a suitable wetting agent, the filter cake can be used in place of the pigment in any conventional printing ink. The microcapsules may be used in carbonless copy paper technology.

18 Claims, No Drawings

MICROCAPSULES, PRINTING INKS AND THEIR PRODUCTION

CROSS REFERENCE TO RELATED APPLICATIONS

This application is a continuation-in-part of application Ser. No. 796,196, filed Nov. 8, 1985, (now abandoned) the specification of which is hereby incorporated by reference.

FIELD OF THE INVENTION

The present invention relates to a process for the production of oil-containing microcapsules, the preparation of pressure-activated chemical copy coatings which can be press applied, and ink vehicles in which the microcapsules can be easily dispersed, as well as to the microcapsules and coatings so produced and the coated products. More particularly, the present invention relates to the production of microcapsules which have hard, thick capsule walls which readily lend themselves to separation and use in press-applied printing inks.

BACKGROUND OF THE INVENTION

In the manufacture of pressure-sensitive recording papers, better known as carbonless copy papers, a layer of pressure-rupturable microcapsules containing a solution of colorless dyestuff precursor is normally coated on the back side of the front sheet of paper of a carbonless copy paper set. This coated backside is known as the CB coating. In order to develop an image or copy, the CB coating must be mated with a paper containing a coating of a suitable color developer, also known as dyestuff acceptor, on its front. This coated front color developer coating is called the CF coating. The color developer is a material, usually acidic, capable of forming the color of the dyestuff by reaction with the dyestuff precursor.

Marking of the pressure-sensitive recording papers is effected by rupturing the capsules in the CB coating by means of pressure to cause the dyestuff precursor solution to be exuded onto the front of the mated sheet below it. The colorless or slightly colored dyestuff, or dyestuff precursor, then reacts with the color developer in the areas at which pressure was applied, thereby effecting the colored marking. Such mechanism for the technique of producing pressure-sensitive recording papers is well known.

Among the well known color developers used on CF record sheets are phenolic-type resins, such as acetylated phenolic resins, salicylic acid modified phenolics and, particularly, novolac type phenolic resins.

Among the well known basic, reactive, colorless chromogenic dye precursors useful for developing colored marks when and where applied to a receiving sheet coated with such color developers are Crystal Violet Lactone (CVL), the p-toluenesulfonate salt of Michler's Hydrol or 4,4'-bis(diethyllamino)benzhydrol, Benzoy Leuco Methylene Blue (BLMB), Indolyl Red, Malachite Green Lactone, 8'-methoxybenzoindoline spiropyran, Rhodamine Lactone, and mixtures thereof.

Microencapsulation has been used in the production of chemical copy papers for some time. One of the major techniques involves phase separation from an aqueous solution. The complex coacervation process (U.S. Pat. No. 2,800,457 and others) falls into this category. In such a process, a phase separation into a liquid condensed colloid phase and a dilute colloid phase results from two oppositely charged condensed colloids neutralizing each other. Under appropriate conditions, the condensed colloid phase can be induced to first surround and envelope the oil droplets, and then be hardened to form the microcapsules.

Polymer insolubilization by pH adjustment is another implementation of this general technique. The polymer must become insoluble in water within a specific pH range. Casein is a high molecular weight (33,600–375,000) globular protein with pendant amino, hydroxyl, and carboxylic acid groups, and as such possesses this property. Alone, the polymer is essentially insoluble in water, and this insolubility is at a maximum at its isoelectric point of pH 4.6. However, through salt formation with the amino and carboxylic acid groups, casein will dissolve in bases and in strong acids (pH 8, pH 3). Thus, the solubility of casein in water can be controlled by pH adjustment. This property has been used in the prior art to encapsulate oils and solids. Japanese Pat. Nos. 37/7727, 37/7731, and 37/9681, disclose the microencapsulation of dye solutions by precipitation. The dye solution is first dispersed into an alkaline solution of casein wherein the casein (actually sodium caseinate) acts as a polymeric emulsifier. Then, the pH is gradually decreased to 4.6, causing the casein to precipitate onto and envelop the droplets. The resulting capsules were stabilized and strengthened/hardened by insolubilizing the casein with formaldehyde or by drying the capsules through spray drying. A similar preparation of capsules is disclosed in French Pat. No. 1470724. In all cases, as a result of the chemistry of aldehyde hardeners, a structurally strong capsule that can withstand moderate amounts of shear and pressure commonly incurred during handling was not achieved until the capsules were completely dry.

This encapsulation technique has several disadvantages:

(1) The precipitation of casein as a solid does not uniformly occur at the interface of the oil droplet. The nucleation and growth of the solid occurs in the bulk of the water, creating particles of casein of varying size, some of which may or may not collect at the oil-water interface. The result is a non-uniform layer of casein around the droplets. This capsule can have varying thicknesses around the circumference, with numerous cracks or holes in coverage. As a result, the capsules have a great tendency to leak, producing discoloration when used in carbonless papers, and limited shelf life.

(2) The capsules are extremely fragile, and must be spray dried before they are sufficiently strong to withstand normal handling. Thus, they are essentially useless in applications where strong wet capsules are required, as in the case of applying them to paper.

(3) The process uses a high casein:oil ratio, and must be performed at a low solids content (10%) in order to maintain a workable viscosity when the casein is precipitated. This makes subsequent coating or processing (drying) expensive due to the large amounts of water that must removed.

In response to these shortcomings, interfacial polymerization or interfacial crosslinking was developed. In U.S. Pat. No. 4,138,362, an amine containing polymer is crosslinked or polymerized at the interface by a polyisocyanate dissolved in the dye solution, which is emulsified in the polymer. In the case of casein, the capsules produced by this method are extremely poor. The capsules are very fragile, due to a very thin wall, and exhibit poor aging as a result of a steady release of the solution they contain.

This problem apparently stems from (1) the colloidal nature of casein solutions (they exhibit the Tyndall effect), (2) the high molecular weight of casein, and (3) the anionic (charged) nature of sodium or alkali metal salt solutions of casein. The alkali salt of casein functions as a high molecular weight polyanionic emulsifier and protective colloid. When an oil is emulsified in an alkaline casein solution, a thin layer is formed around the droplet. The polyisocyanate can crosslink this small amount of casein absorbed on the surface, but additional casein cannot reach the isocyanate. The very properties that make sodium caseinate a good emulsifier and protective colloid inhibit further reaction. Namely, the negative charge around the droplet created by the thin molecular layer creates the familiar double layer that functions as a barrier to further penetration of ionized casein to the droplet surface. The high molecular weight also sterically hinders the diffusion of additional casein to the reaction zone near the oil-water interface. The fragile capsules produced by the simple interfacial polymerization/crosslinking are inadequate for the processing procedures needed for preparing carbonless papers, namely, filtration and dispersion into ink vehicles.

Another method to improve the strength of capsule walls is shown in U.S. Pat. No. 4,404,251, which discloses printing ink containing microcapsules containing dye precursors. The microcapsules are made by polyaddition of a polyisocyanate and a polyamine, and the aqueous phase may contain protective colloids and emulsifiers. The formed microcapsules are formulated into the printing ink composition by stirring the aqueous dispersion of microcapsules directly into the binder and subsequently removing the water in vacuo. Alternatively, the microcapsules may be spray dried and then added to the binder. Dispersing aids, preferably cationic surfactant, may be added to the ink to prevent agglomeration of the microcapsules.

Reference is also made to U.S. Pat. No. 4,193,889 which discloses microcapsules and a process for the production of microcapsules the walls of which consist of polycondensates of a film-forming aliphatic polyisocyanate containing at least one biuret group, or polyaddition products thereof, with a chain extending agent. The chain extending agent is preferably either water, a polyol or a polyamine. It is stated in that patent that the so-produced microcapsules have improved toughness, show adequate crosslinking density, and, therefore, are only slightly permeable to easily volatile encapsulated substances.

Another method for dealing with the problems of fragile microcapsules is disclosed in U.S. Pat. No. 4,435,340, wherein an isocyanate is used in the hydrophobic phase and a polyamine, such as a low molecular weight polyamine, is used in the hydrophilic phase. Microcapsules are formed by interfacial polymerization.

U.S. Pat. No. 4,356,108 discloses an encapsulation process by interfacial reaction of an isocyanate and a low molecular weight polyamine. U.S. Pat. No. 4,112,138, and 4,097,619 disclose a process for the application of microcapsules to paper by means of a non-aqueous solvent-free hot melt system, or by means of a radiation-curable system. In U.S. Pat. No. 4,161,570, microcapsules are added to a radiation-curable substance without first spray-drying.

According to the oldest prior art concerning the technology of CB coating, such coating was carried out with an aqueous coating composition over the entire surface of the substrate, as shown in German Offenlegungsschrifts Nos. 1,934,437 and 1,955,542. The process described in these patents has the disadvantage that, following application of the coating composition, the water is evaporated and this requires a considerable input of energy. Additionally, the need for drying requires the use of a complex and expensive apparatus for continuously drying a substrate which has been coated with an aqueous coating composition. Another problem concerns removal of the polluted water which emanates from production and from the purification of the aqueous coating composition.

If volatile organic solvents are used in the production of the coatings, the excess solvent also has to be evaporated in order to dry the coating. This results in the formation of solvent vapors which are particularly dangerous.

There are numerous known processes for applying coating compositions to a paper substrate. According to the prior art, aqueous or solvent-containing coatings may be applied to a paper substrate by rotogravure or flexoprinting, as shown in U.S. Pat. Nos. 3,016,308 or 3,914,511. These processes also have the disadvantage that the coatings must be subsequently dried. For these reasons, it was proposed, as shown in U.S. Pat. Nos. 3,079,351 and 3,684,549, to take up the microcapsules in waxes and to coat the paper substrate with hot melt systems of this type. Although these proposed measures avoid removal of the solvents, the wax-like coating changes the character of the paper because relative large quantities of wax must be applied. Additionally, the melt systems are applied by means of hot carbon printing machines which, although enabling printing, coating with waxes, and finishing to be combined in an online system, always require a separate installation for each process step.

Processes for printing microcapsules in coating compositions on offset printing machines or even book printing machines were heretofore regarded as unworkable because both in the production of the printing ink and in the distributor rollers of the printing machine and during the printing process, shearing and compressive forces would destroy most of the microcapsules. A process for accomplishing such printing inks is described in U.S. Pat. No. 4,404,251 in which formed microcapsules are formulated into the printing ink composition either by stirring the aqueous dispersion of microcapsules directly in the binder and subsequently removing the water in vacuo (the so-called flusing process), or by spray-drying the microcapsules and then adding to the binder. These processes require special equipment and are not entirely satisfactory. In the former process, the hydrophilic nature of the microcapsules may make direct incorporation into the binder very difficult. The spray-drying technique is very costly. Furthermore, during spray-drying some capsules inevitably aggregate which results in a large particle size distribution. The aggregates can easily reach 100 microns or more, and once formed are virtually impossible to break up non-destructively to the capsule. Such large particles are quite unsuitable for inks.

Accordingly, the need remains for improved microcapsules which are sufficiently strong to be dispersed in an ink vehicle and press applied.

SUMMARY OF THE INVENTION

That need is met by the present invention, where the object is to eliminate the deficiencies of the prior art, such as those set forth hereinabove.

It is a further object of the present invention to provide improved microcapsules.

It is another object of the present invention to provide an improved process for preparing microcapsules used in carbonless copy paper technology, including for use in preparing CB carbonless copy sheets.

It is yet another object of the present invention to provide microcapsules for use in carbonless copy paper technology which have strong thick walls and thus permit their application by printing press without the destruction of the microcapsules.

It is still a further object of the present invention to provide microcapsules for use in carbonless copy paper technology having surface groups which permit easy lipophilization so as to readily facilitate the separation of the microcapsules from water.

It is yet another object of the present invention to provide microcapsules for use in carbonless copy paper technology which may be easily dispersed in a printing ink directly from the aqueous filter cake without the necessity of milling or drying.

It is yet a further object of the present invention to provide a process for producing a printing ink containing microcapsules suitable for carbonless copy paper technology, to produce the printing ink itself, to provide a process for printing the microcapsules and to a substrate having such a printing ink printed thereon.

These and other objects, features and attendant advantages of the present invention will become apparent to those skilled in the art from a reading of the following detailed description of embodiments in accordance therewith.

In summary, the present invention includes a method for forming microcapsules that are sufficiently strong to be dispersed in an ink vehicle and spread onto a substrate. The microcapsules can be readily separated from the aqueous solution in which they are formed, and a printing ink can be made directly from the capsule filter cake.

The microcapsules are formed using a polyelectrolyte complex or a polysalt consisting of a high molecular weight polyanion, i.e., an alkali-soluble polymer with repeating units containing carboxylic, phosphoric, or sulfonic acid groups and/or amino acid groups, and a low molecular weight polycation such as a polyamine with a functionality of at least 3. An oil solution of dye precursor containing a crosslinker is dispersed into an aqueous solution of the polyanion. The polycation may be added before or after such dispersing step. The crosslinker reacts with the polyamine-polyanion complex to form a strong, thick-walled capsule. Heat treatment accelerates the crosslinking. A denatured crosslinked layer of polyanion builds up around the droplet, thus producing a tough, thick capsule wall.

The microcapsules formed by the process according to the present invention can be easily separated from the aqueous solution in which they are formed. In order for the microcapsules to be readily filterable from an aqueous medium and dispersable in non-aqueous coating vehicles, they should be capable of being made lipophilic prior to filtration. The moieties on the outer surface of the capsules made in accordance with the present invention may be easily blocked by lipophilic agents in order to make the capsules decidedly non-polar.

Printing ink can be made directly from a filter cake containing the capsules. When the capsules are made according to the present invention, the capsules have already been lipophilized, and thus the water in the filter cake may be simply replaced by an ink vehicle. No milling is required to disperse the capsules. A wetting agent is added to the ink vehicle before the filter cake is added and, upon stirring, the cake breaks up into a fine dispersion of capsules. The wetting agent is chosen such that a salt is formed with the casein which renders the capsules oleophilic and separates them from their water jackets.

DETAILED DESCRIPTION OF PREFERRED EMBODIMENTS

CB coated papers can be readily made by coating paper with an aqueous or oil-based dispersion of the capsules. Since the capsules are relatively strong, a dispersion of the capsules can be coated onto paper using a standard printer. To make microcapsules according to the process of the present invention, a solution of dye containing a crosslinker is emulsified into a solution of casein or other polyanion that has been dissolved using a weak base such as borax (sodium tetraborate). A polyamine preferably with a functionality of 3 or more, and preferably having a molecular weight of less than 1,200, is added.

With the preferred cationic polyamines it has been found that a molecular weight of 1,200 or more may cause coacervation to occur immediately, with the result that a polycationic (polyamine)/polyanionic(casein) complex separates as a distinct liquid phase. This is undesirable. Accordingly, the preferred cationic polyamines have a molecular weight of less than 1200. With a less cationic polyamine (having a cationic charge of less than 3) a higher molecular weight is possible. However, such materials are not preferred.

The preferred polyamine also preferably has at least one active hydrogen available on at least two of the three amino groups. Examples of suitable polyamines are diethylenetriamine, triethylenetetramine, iminobispropylamine, bis(hexamethylene)triamine, polyoxypropylenetriamines, polyoxypropylenepolyamines, and amine epoxy adducts (hydroxyalkyl-substituted polyamines).

In the present encapsulation process, the action of the cationic polyamine on the polyanion has been found to produce a gel-like flocculant about the droplet. The action of heat and of the crosslinker builds up a denatured crosslinked layer of polyanion about the droplet which produces a tough thick capsule wall. Heat treatment accelerates the crosslinking.

Any crosslinking agent which reacts with both segments of the polyamine-polyanion complex simultaneously, or with the polyamine segment causing the polyanion segment to precipitate concurrently, or both, will be operable in the present invention. Examples are polyisocyanates, polyacid chlorides, polyanhydrides, polyepoxides, polychloroformates, or polyaldehydes. It has been found that the crosslinking agent works best in the system of the present invention when it contains a functionality of at least three.

Isocyanates suitable for this purpose are polyisocyanates and polyisocyanate prepolymers. The term "polyisocyanate" includes polyisocyanates and polyisothiocyanates. Examples of suitable oleophilic polyisocyanates include diisocyanates such as m-phenylenediisocyanate, p-phenylenediisocyanate, 2,6-tolyenediisocyanate, 2,4-tolylenediisocyanate, naphthalene-1,4-diisocyanate, diphenylmethane-4,4'-diisocyanate, 3,3'-dimethyldiphenylmethane-4,4'-diisocyanate, xylylene-1,4-diisocyanate, xylylene-1,3-diioscyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate, cyclohexylene-1,4-diisocyanate, xylylene-1,4-diisothiocyanate, ethylidynediisothiocyanate, hexamethylenediisocyanate, etc.; triisocyanates such as 4,4',4"-triphenylmethanetriisocyanate, toluene-2,4,6-triisocyanate, etc: and tetraisocyanates such as 4,4'-dimethyldiphenylmethane, 2,2',5,5'-tetraisocyanate, ect. Particularly preferred are the addition product of hexamethylene diisocyanate and hexane triol, the addition product of 2,4-tolylene diisocyanate with pyrocatechol, the addition product of tolylene diisocyanate with hexane triol, the addition product of tolylene diisocyanate with trimethylol propane, or suitable polyisocyanates analogous to the compounds mentioned, or methylene(-polyphenyl isocyanate).

Other usable modified isocyanates are those based on hexamethylene-1,6-diisocyanate, m-xylylene diisocyanate, 4,4'-diisocyanato-dicyclohexyl methane and isophorone diisocyanate which contain at least two functional isocyanate groups per molecule. Polyisocyanates based on derivatives of hexamethylene-1,6-diisocyanate having a biuret structure, as disclosed in U.S. Pat. No. 4,051,165, are also comprehended.

Concentrations of the components in the encapsulation process of the present invention are suitable as follows, expressed in parts by weight:

|  | Allowed range | Preferred |
|---|---|---|
| Polyanion | 45–180 | 135 |
| Polyamine | 1.5–20 | 15 |
| Water | 1500 | 1500 |
| Oil | 900–990 | 960 |
| Dye precursors | 10–100 | 40 |
| Crosslinker | 32–131 | 98.5 |
| Weak base (optional) | 6.75–27 | 20.25 |

To achieve readily filterable capsules, it is desirable that the aqueous polymers (polyanions) used in the encapsulation possess several characteristics that will facilitate their separation from water. First, it is preferred that the polymers be easily insolubilized. Second, they should preferably contain functional groups with which lipophilizing agents will react preferentially in the presence of water. Typical lipophilizing agents can be organized into two groups: (1) alkyl or aryl-acids, -aldehydes, -acid chlorides, -isocyanates, and -halides; and (2) alkyl or aryl amines, quaternary ammonium salts, and metal chelates. With a polyanion such as casein the amino moiety will react with the first group of the above agents instantaneously. Such reactions are routinely performed in the presence of water. Likewise, the carboxylic acid moiety of casein will readily react with the second group to form metal and amino salts in water. A polyanion having carboxylic acid pendant groups is thus particularly desirable.

Accordingly, the preferred polyanions of the present invention are alkali-soluble ones having a readily inducible water solubility and pendant carboxylic phosphoric or sulfonic acid groups and/or amino acid group. Examples are the proteins, such as casein, sodium caseinate soya or zein, and the polycarboxylic acids, such as polyacrylic acid, or various maleic acid or maleic anhydride copolymers, such as maleic anhydride-vinylether copolymers. Other acrylic acid copolymers, such as acrylic methacrylic acid copolymers, and maleic anhydride copolymers, such as styrene-maleic anhydride or ethylene-maleic anhydride copolymers, may also be used.

Using casein as an example, it has been found that if the amino and carboxylic acid groups of the casein on the outer surface of the capsules are blocked by lipo agents, then the casein capsule will be decidedly nonpolar. The result will be a capsule that is readily filtered from water and dispersible in non-aqueous coating vehicles.

The encapsulation technique according to the present invention is ideal for preparing capsules separable by filtration. Most other encapsulation techniques use water soluble polymers, other than those listed above, either as wall forming materials or as protective colloids. The presence of these polymers, such as polyvinyl alcohol, starches, and celluloses and derivatives, renders the resulting capsule slurry unfilterable in the practical sense, and the capsules virtually impossible to redisperse in non-aqeuous vehicles.

As a result, dispersing capsules into ink vehicles has in the past posed problems. A pigmented or otherwise filled ink must be finely milled to achieve an ink with good press characteristics. Caking, piling, or other problems are sure to develop if a fine dispersion is not produced. In the case of pressure-rupturable capsules, the high energy dispersing techniques generally employed with pigments cannot be used. Consequently, capsules are typically spray-dried into a fine powder, and dusted into non-aqueous coating vehicles. This technique is very costly and not entirely satisfactory. During spray-drying, some capsules inevitably aggregate, which results in a large particle size distribution. The aggregates can easily reach 100 microns or more, and, once formed, are virtually impossible to break up non-destructively to the capsule. Such large particles are quite unsuitable for inks.

The wet filter cake, however, contains capsules surrounded by water. The capsules are not aggregated, but are merely condensed. No milling is required to disperse the capsules. The water in the filter cake is simply replaced by an ink vehicle, and a CB ink results.

The preparations according to the present invention have been designed to facilitate the task of dispersing the capsules in an ink vehicle. The lipophilization conducted prior to filtration makes the dispersion of the capsules straightforward. It is only necessary to dissolve a specific wetting agent into the ink vehicle and drop in the wet filter cake. After moderate stirring, the cake will break up into a fine dispersion of capsules. For oil base inks, the preferred wetting agent is a cationic wetting agent which will displace the water from around the capsules, such as an ethoxylated long chain $C_{12-22}$ alkyl amine such as N,N-diethanol soya amine (Mazeen S-2, a trade name of the Mazer Chemical Co., Gurnee, Ill.). The wetting agent produces two distinct dispersions: the capsules in oil and water in oil. The dispersant forms a salt with casein which renders the capsule oleophilic, and separates the capsules from their water jackets. If the capsules were lipophilized with a quaternary ammonium salt, such as stearyl dimethyl benzyl ammonium chloride, and if the viscosity is low enough, the water can be decanted. For glycol based inks, the wetting agent can be simply an ethoxylated amine or a very short chain ethoxylated amine like monoethanol amine. N,N-diethylethanolamine. N-methyldiethanolamine, or the like. In the latter case, the water becomes part of the ink vehicle.

The wetting agents can be any cationic wetting agent which is not soluble in both oil and water. Among useful wetting agents are ethoxylated $C_{12-22}$ alkyl amines, such as ethoxylated soya or coca amine. Other useful wetting agents for use in the present invention include mono- and dialkyl benzyl ammonium halides, such as stearyl dimethyl benzyl ammonium chloride. The alkyl chains of those quaternary compounds can range from $C_6$ to $C_{20}$.

The microcapsules can be formulated into any conventional printing ink for use in the various types of printing by merely substituting the microcapsule filter cake, obtained in accordance with the present invention, for the pigment of the ink and using an appropriate wetting agent.

An advantage of the present invention is that dryers are not needed when the microcapsule-containing printing ink of the present invention is used. This is true even when the printing ink is an aqueous one; whereas, conventional aqueous inks require a substantial amount of drying by external dryers after application of the ink to the paper web substrate and prior to wind-up. As mentioned previously, no additional water need be added when the microcapsule filter cake is placed in the ink vehicle. Rather, with a glycol based ink the water of the filter cake becomes a part of the ink vehicle. The result is a high solids printing ink which may be press applied at low coat weights and which requires minimal amounts of drying.

There is one overall constraint on the present invention: no material in contact with the capsules can possess significant mutual, simultaneous, oil and water miscibility. Capsule leakage or destruction may occur if one does not adhere to this restriction.

The following examples will more clearly define the invention.

EXAMPLE I

Solution A

In a 2 liter beaker, 36.4 grams of Crystal Violet Lactone and 3.6 grams Copiken XX (a color precursor manufactured by Hilton-Davis of Cincinnati, Ohio) are dissolved in 960 grams of di-isopropyl naphthalene. At room temperature 98.5 grams Desmodur L2291A (a biuret-containing polyisocyanate made by Mobay Chemical Corp., Pittsburgh, Pa.) are added and stirred until a clear solution is obtained.

Solution B

In a four liter beaker, 135 grams casein are added to 1.7 liters water. The solution is heated to 80-85 degrees C., held for 30 minutes, and then cooled to 60 degrees C. 20.25 grams of borax are added, the solution stirred for 15 minutes, then cooled to room temperature.

Solution B is placed in a Waring blender connected to a variac. With the blender set on high and the variac at 50%, solution A is slowly poured into the vortex of Solution B within a period of two minutes. After the addition of A is complete, the variac is set to 100% and the blender is allowed to run for only 30 seconds. The emulsion is transferred to the four liter beaker, and stirred moderately to produce a slight vortex. Then, 15 grams diethylene triamine in 15 grams water is added to the emulsion. The mixture is heated to 60° C. and held at that temperature for about two hours. The capsule slurry is then cooled to room temperature. The average capsule size is about 7 microns.

EXAMPLE II

Example I is repeated using a solution containing 130 grams of soya protein rather than casein. The average capsule size is about 7 microns.

EXAMPLE III

Example I is repeated using a solution containing 140 grams of zein instead of the casein and with the addition of sufficient sodium hydroxide to raise the pH to 11.5 and thus cause dissolution of the zein. Microcapsules are formed having an acceptably tough outer skin.

EXAMPLE IV

Example I is repeated using a polyacrylic acid (Carboset 525 from B. F. Goodrich Chemical Company) as a replacement for the casein to form acceptable microcapsules.

In Example I, the polysalt is formed after the emulsion. Alternatively, the polysalt may be formed initially and used directly.

EXAMPLE V

Solution A is prepared as in Example I.

Solution B

In a four liter beaker, 35 grams casein is added to 1.7 liters water, heated to 80°-85° C. and held for about 30 minutes. After cooling to 60° C., 15 grams diethylene triamine is added. The solution is stirred until the casein dissolves, and then cooled to room temperature.

As in Example I, the Waring blender is charged with B, and then A is added over a two minute period with the blender set on high and the variac at 50% power. After all of A is added, the power is adjusted to 100% for 30 seconds. The mixture is transferred to the four liter beaker, and heated for two hours at 60° C. with stirring.

EXAMPLE VI

To the capsule slurry in Example I, 15 grams of a 40% solution of glyoxal is added. After stirring for at least fifteen minutes, the slurry is left to stand overnight. The slurry is then diluted with two liters of water. A solution of 19.6 grams of glacial acetic acid in 560 grams water is slowly added to the stirred capsule dispersion. After about half of the acid is added, the mixture thickens. At this point, the addition of acid is halted for 15 minutes during which time the dispersion thins out. The remainder of the acid solution is then added to the now flocculated capsule dispersion. The mixture may now be vacuum filtered with a Buchner funnel. A filter cake containing approximately 20% water is obtained. The filter cake may be stored in a sealed container, and should be refrigerated if the cake is not to be used within a day.

EXAMPLE VII

The capsule slurry of Example I is diluted with 1.5 liters of water. Then 2.5 grams of M-Quat 2475 (Dicocodimethyl ammonium chloride, from Mazer Chemicals, Inc., Gurnee, Ill.) is dispersed in 500 ml of water and added to the stirred capsule slurry. As in Example IV, a solution of 19.6 grams glacial acetic acid in 560 ml water is added in the above manner to bring the pH to 4.5. The mixture is then vacuum filtered to a cake containing about 30% water.

EXAMPLE VIII

In a 1 liter beaker charged with 196 grams diethylene glycol, 177.5 grams Lacros 294 resin (acid modified tall oil rosin resin, of Crosby Chemicals, Division of Silvachem, New Orleans, La.) is dissolved. It is necessary to heat the glycol to about 90° C. to form a homogeneous solution. The solution is cooled to 60° C., and 18.4 grams monoethanol amine and 7.5 grams Crayvalla SF (a thixotropic agent, manufactured by Cra-Vac Industries, Inc. of Toronto, Canada) are added. This mixture is cooled to 40° C. or less. Four hundred grams of the wet filter cake from Example VI are dispersed into the mixer, using a paddle-type propeller on a medium speed mixer. After four hours, the mixture is poured through a 150 micron nylon mesh filter bag into the desired container. The product is a moisture set chemical copy ink that is suitable for application from a Transfer-Letterpress.

EXAMPLE IX

In a four liter beaker are mixed 967 grams VMP naphtha, 483 grams mineral spirits, and 83 grams Mazeen S-2. With moderate stirring, 1,567 grams of the wet filter cake from Example VII are dispersed into the liquid. Then, 780 grams of Piccotex 120 (hydrocarbon resin, product of Hercules, Inc., of Wilmington, Del.) are dissolved into the mixture. The final product is a chemical copy ink suitable for flexographic or gravure printing.

EXAMPLE X

Solution A

Eight grams of CVL and 13.15 g PA-18 resin (a polyanhydride crosslinker from Gulf Oil Chemicals Co.) are dissolved in Sure-Sol 290 (a biphenyl solvent mixture from Koch Chemical Company, Wichita, Kans.).

Solution B

In a separate beaker, 18 g casein is added to 280 ml water. The mixture is heated to 80°-85° C. and held for 30 minutes. After cooling to 60° C., 2.7 g of borax (sodium borate decahydrate) is added. The resulting mixture is stirred for 15 minutes, and then cooled to room temperature.

Solution B is placed in a Waring blender connected to a variac. With the blender set on high and the variac at 70%, solution A is poured into the vortex of B within a period of 1½ minutes. On completion of this addition, the variac is set to 100%, and the blender is allowed to run for 30 seconds. The emulsion is transferred to a 1 L beaker, and stirred moderately to produce a slight vortex. Then 2 g diethylene triamine in 2 g water is added to the emulsion. The mixture is heated to 55°-60° C. and held there for 2 hours. The average capsule size is 3 microns.

EXAMPLE XI

Solution A

A 13.15 g quantity of PA-18 resin (a polyanhydride crosslinker from Gulf Oil Chemicals Co.) is dissolved in 192 g of Sure-Sol 290 (a biphenyl solvent mixture from Koch Chemical Company, Wichita, Kans.) by heating to 120° C. The solution is cooled to 90° C., and 7.4 g of CVL is added. The mixture is then cooled to room temperature.

Solution B

In a separate beaker, 18 g casein is added to 300 ml water. The mixture is heated to 80°-85° C. and held for 30 minutes. After cooling to 60° C., 2 g diethylene triamine is added. The mixture is stirred for 15 minutes, and then cooled to room temperature.

Solution B is placed in a Waring blender connected to a variac. With the blender set on high and the variac at 70%, solution A is poured into the vortex of B within a period of 55 seconds. On completion of this addition, the variac is set to 100%, and the blender is allowed to run for 15 seconds. The emulsion is transferred to a 1 L beaker, and stirred moderately to produce a slight vortex. The emulsion is heated to 60° C. and held for 2 hours. The capsule slurry is then cooled to room temperature. The average capsule size is 9 microns.

EXAMPLE XII

Solution A

A mixture of 20 g EPN 1138 (an epoxy novolac crosslinker from Ciba-Geigy), 9 g Pergascript I-BR, and 3.1 g Pergascript I-36 (both color former compounds from Ciba-Geigy) is dissolved in 16802 g Benzoflex 9-88 (an organic solvent from Velsicol Chemical Co.).

Solution B

A 27 g quantity of casein is dissolved in a solution of 4.27 g Hardener HY 943 (an aliphatic/polyamine-epoxy adduct from Ciba-Geigy) in 269 ml water.

Solution B is placed in a Waring blender connected to a variac. With the blender set on high and the variac at 35%, solution A is poured into the vortex of B within a period of 1 minute. On completion of this addition, the variac is set to 80%, and the blender is allowed to run for 30 seconds. The emulsion is transferred to a 1 L beaker, and stirred moderately to produce a slight vortex. A solution of 1.35 g borax in 70 ml water is added. The emulsion is heated to 65°-70° C. and held for 3 hours. When the temperature reaches 60° C., 1 g of Accelerator DY064 (tri(dimethylaminoethyl)phenol [DMP-30] from Ciba-Geigy) in 9 ml water is added.

EXAMPLE XIII

Solution A

A mixture of 3.6 g CVL and 12 g iso-phthaloyl chloride is dissolved in 110 g Meflex DC029 (a chlorinated paraffin solvent from ICI America, Inc.).

Solution B

In a separate beaker, 18 g casein is added to 300 ml water. The mixture is heated to 80°-85° C. and held for 30 minutes. After cooling to 60° C., 2.7 g borax is added. The mixture is stirred for 15 minutes, and then cooled to room temperature.

Additional borax may be added to solution B if the iso-phthaloyl chloride of solution A contains significant amounts of HCl.

Solution B is placed in a Waring blender connected to a variac. With the blender set on high and the variac at 100%, solution A is poured into the vortex of B within a period of 1 minute. On completion of this addition, the emulsion is quickly transferred to a 1 L beaker, and stirred moderately to produce a slight vortex. A solution of 6.83 g diethylene triamine and 3.7 g sodium carbonate in 30 ml water is immediately added. The dispersion is stirred for 3 hours. The average capsule size is 9 microns.

The dispersion gells in a couple of minutes due to hydrolysis of the acid chloride-generation of HCl. The polyamine should therefore be added before significant hydrolysis has occurred.

It will be obvious to those skilled in the art that various changes may be made without departing from the scope of the invention and the invention is not to be considered limited to what is shown in the drawings and described in the specification.

What is claimed is:

1. A process for the production of microcapsules containing an oily solution, comprising:
   dispersing an oily solution including a crosslinking agent into an aqueous solution;
   forming a polysalt in said aqueous solution, said polysalt including a high molecular weight polyanion which can be made substantially nonpolar by reaction with a lipophilizing agent and a polycationic polyamine having a molecular weight of less than 1200 and having a functionality of at least three, whereby a hard, thick layer is formed around droplets of said oily solution and microcapsules are produced, and
   adding a sufficient amount of a lipophilizing agent to cause the outer surface of said microcapsules to become substantially nonpolar.

2. The process of claim 1, wherein said microcapsules are filtered from said aqueous solution to obtain a filter cake containing less than about 35% water.

3. The product produced by the process of claim 2.

4. The process of claim 1, wherein said oily solution contains a dye precursor.

5. The process of claim 1, wherein the crosslinking agent is selected from the group consisting of polyisocyanates, polyacid chlorides, polyanhydrides. polyepoxides, polychloroformates, and polyaldehydes.

6. The process of claim 1, wherein said polyanion is selected from the group consisting of casein, sodium caseinate, zein, soya protein, polyacrylic acids, acrylic acid copolymers, maleic acid copolymers, and maleic anhydride copolymers.

7. The process of claim 1, wherein said polyanion is casein.

8. The process of claim 7, wherein said polycationic polyamine is diethylene triamine.

9. The process of claim 8, wherein said crosslinking agent is a polyisocyanate.

10. A process in accordance with claim 1, wherein said polysalt is formed prior to said dispersing step.

11. A process in accordance with claim 1, wherein said polysalt is formed after said dispersing step.

12. A process for making a printing ink comprising:
    mixing a printing ink vehicle with a wetting agent, and
    adding a filter cake of microcapsules prepared by the process of
    dispersing an oily solution including a crosslinking agent into an aqueous solution;
    forming a polysalt in said aqueous solution, said polysalt including a high molecular weight polyanion and a polycationic polyamine having a functionality of at least three, whereby a hard thick layer is formed around the droplets of oily solution and microcapsules are produced.
    adding a sufficient amount of a lipophilizing agent to cause the outer surface of said microcapsules to become substantially non-polar, and
    filtering said microcapsules from said aqueous solution to obtain the filter cake of microcapsules.

13. The process of claim 12, wherein said ink is an oil-based ink and the wetting agent is selected from ethoxylated $C_{12-22}$ alkyl amines.

14. The process of claim 12, wherein said ink is a glycol-based ink and the wetting agent is an ethoxylated long-chain amine having from 12 to 22 carbon atoms.

15. The process of claim 12, wherein the ink is oil-based and the wetting agent is chosen such that a salt is formed with the polyanion which renders the capsules oleophilic and separates them from their water jackets.

16. The process of claim 15, wherein the wetting agent is selected from the group consisting of N,N-diethanol soya amine and stearyl dimethyl benzyl ammonium chloride.

17. The process of claim 12, wherein the ink is glycol-based and the wetting agent is selected from the group consisting of monoethanolamine and N,N-diethylethanolamine.

18. The product produced by the process of claim 12.

* * * * *